United States Patent [19]
Hale

[11] Patent Number: 5,820,426
[45] Date of Patent: Oct. 13, 1998

[54] EXHAUST SYSTEM FOR PERSONAL WATERCRAFT

[75] Inventor: David J. Hale, Pickett, Wis.

[73] Assignee: Brunswick Corporation, Lake Forest, Ill.

[21] Appl. No.: 803,988

[22] Filed: Feb. 21, 1997

[51] Int. Cl.[6] .................................................. B63H 21/10
[52] U.S. Cl. ............................. 440/88; 440/89; 440/111
[58] Field of Search ................................. 440/88, 89, 75, 440/38, 111; 114/270

[56] References Cited

U.S. PATENT DOCUMENTS

| | | | |
|---|---|---|---|
| 4,631,032 | 12/1986 | Nishida | 440/47 |
| 4,768,983 | 9/1988 | Smith | 440/111 |
| 4,997,399 | 3/1991 | Nakayasu et al. | 440/88 |
| 5,016,439 | 5/1991 | Nitta | 60/310 |
| 5,067,448 | 11/1991 | Nakase et al. | 123/41.31 |
| 5,096,446 | 3/1992 | Tazaki et al. | 440/38 |
| 5,251,439 | 10/1993 | Nakase et al. | 60/310 |
| 5,324,217 | 6/1994 | Mineo | 440/89 |
| 5,389,022 | 2/1995 | Kobayashi | 440/89 |
| 5,421,756 | 6/1995 | Hayasaka | 440/89 |
| 5,460,553 | 10/1995 | Craig et al. | 440/89 |
| 5,531,620 | 7/1996 | Ozawa et al. | 440/89 |
| 5,536,189 | 7/1996 | Mineo | 440/89 |
| 5,550,337 | 8/1996 | Tazaki et al. | 181/235 |
| 5,556,314 | 9/1996 | Fukuda et al. | 440/89 |
| 5,562,509 | 10/1996 | Nakase et al. | 440/89 |
| 5,647,779 | 7/1997 | Nanami | 440/89 |

*Primary Examiner*—Stephen Avila
*Attorney, Agent, or Firm*—Andrus, Sceales, Starke & Sawall

[57] ABSTRACT

An exhaust system for a personal watercraft provides an exhaust adapter plate and an exhaust header pipe that allows exhaust to exit from the rear of a horizontally mounted internal combustion engine. The exhaust adapter plate is mounted to the rear of the engine block. The exhaust adapter plate has openings corresponding to the engine exhaust port and engine cooling water jacket. The adapter plate also has an opening for the engine crankshaft. The exhaust header pipe is mounted to the engine with the adapter plate disposed therebetween. An exhaust passage through the exhaust header pipe passes transversely across the engine compartment within the watercraft. As the exhaust header pipe passes transversely across the engine compartment, the exhaust passage angles upwardly from the exhaust adapter plate to a high point, and angles downwardly from the high point to an exhaust outlet leading to a muffler. The exhaust passage through the exhaust header pipe is tuned, yet the configuration of the exhaust header pipe provides a compact design that is easily packaged within the engine compartment for a personal watercraft, and also provides for sufficient space rearward of the exhaust header pipe so that the exhaust system and the remainder of the engine can be easily serviced. Also, since the exhaust header pipe and the exhaust adapter plate are physically separate components, each can be designed to be manufactured using simpler manufacturing techniques.

22 Claims, 5 Drawing Sheets

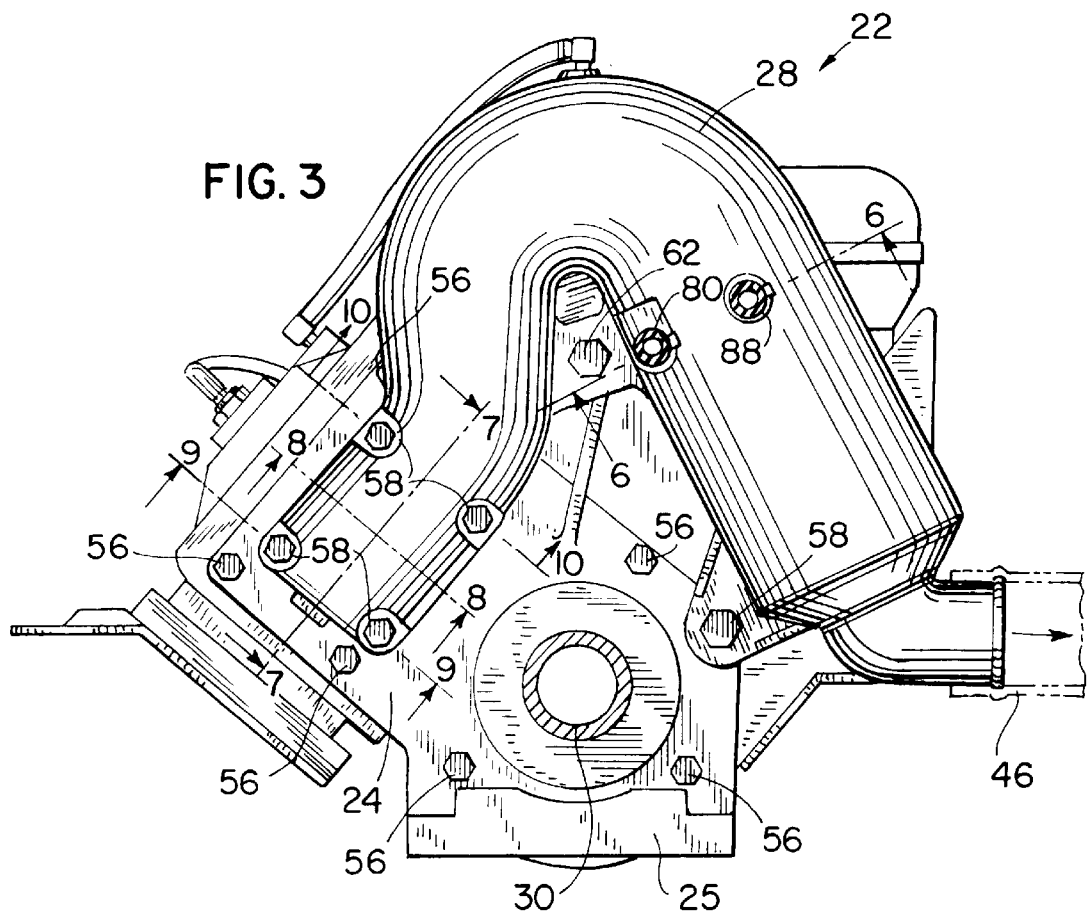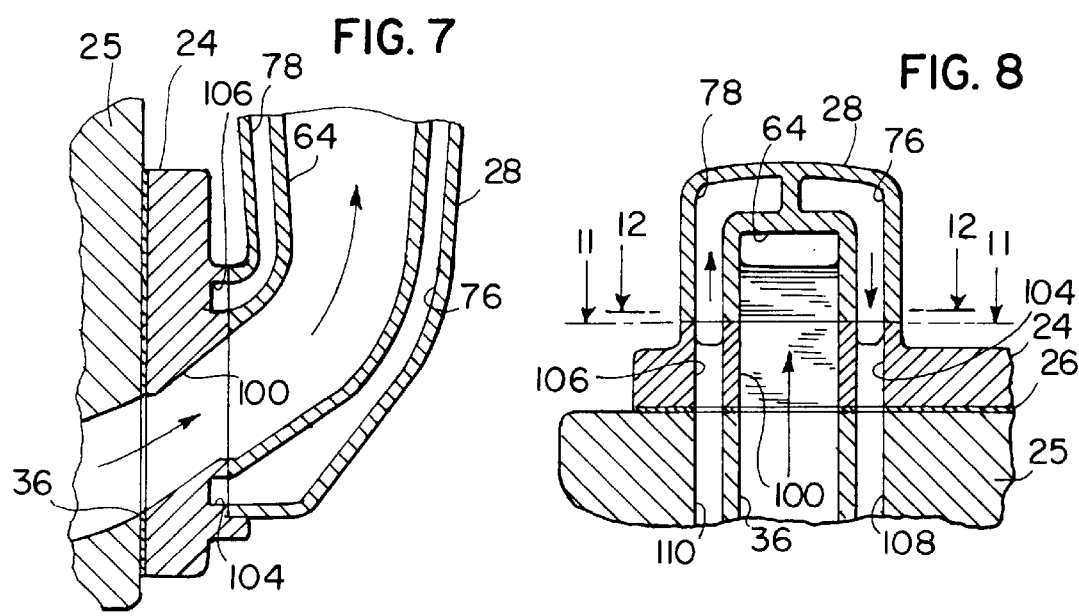

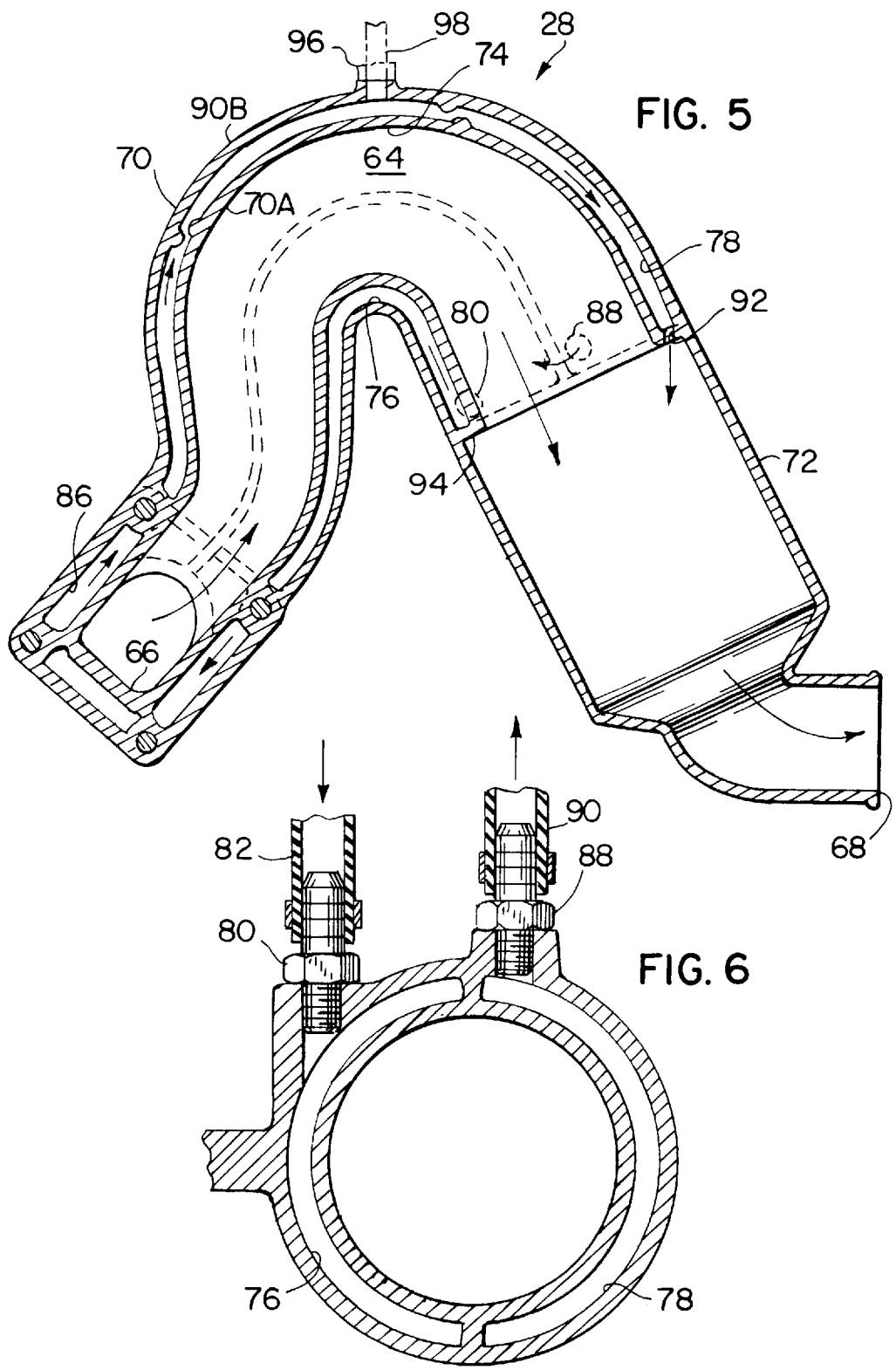

EXHAUST SYSTEM FOR PERSONAL WATERCRAFT

FIELD OF THE INVENTION

The invention relates to exhaust systems for personal watercraft. In particular, the invention relates to an exhaust adapter plate and exhaust header pipe for a personal watercraft that allows exhaust to exit from the rear of the engine block, yet facilitates efficient packaging and serviceability.

BACKGROUND OF THE INVENTION

Personal watercraft are typically constructed by attaching a deck shell to a hull shell to form an engine compartment therebetween. An internal combustion engine that is located in the engine compartment powers the watercraft. Exhaust gases from the engine must be discharged from the engine and from the engine compartment into the atmosphere, either into air or water.

A conventional exhaust system for a personal watercraft has an exhaust pipe connected to an exhaust port manifold on the engine. The exhaust pipe extends from the engine and is usually connected to a muffler. With conventional two-cycle engines, the length of exhaust pipe upstream of the muffler is normally large to allow for tuning. The large exhaust pipe may cause space constraints within the engine compartment of the personal watercraft.

To utilize space within the engine compartment, prior personal watercraft exhaust systems typically route exhaust out the side of the engine through an exhaust manifold, route the exhaust forward from the exhaust manifold, then loop the exhaust back over the top of the engine. With this type of exhaust system, the engine is difficult to service. The exhaust pipes cover the engine and must usually be removed to service the engine. Additionally, removing bolts to remove the exhaust pipes from the engine can be awkward. It is desirable to have an exhaust system that is efficiently packaged and accessible to enhance serviceability of the exhaust system as well as the remainder of the engine.

Exhaust system components often have complex configurations, and are typically made of sand cast aluminum. Sand cast aluminum manufacturing technology tends to create expensive components. Thus, it is also desirable to design components for the exhaust system that can be manufactured with simple die casting and/or lost foam casting techniques, which create significantly less expensive components than normal sand casting.

BRIEF SUMMARY OF THE INVENTION

The invention is an exhaust system for a personal watercraft having an engine block mounted within the watercraft engine compartment so that the engine crankshaft is horizontal. The exhaust system effectively discharges exhaust from the rear of the engine block to the atmosphere. The exhaust system facilitates effective tuning for a two-cycle engine, yet is efficiently packaged to conserve space within the watercraft engine compartment. In addition, the exhaust system is designed so that the components of the exhaust system can be manufactured with simple die casting and/or lost foam casting techniques. Further, the exhaust system is designed so that mounting bolts are easily accessible, thus enhancing the serviceability of the exhaust system as well as the remainder of the engine.

In one aspect, the exhaust system includes an exhaust header pipe having a tuned exhaust passage that is mounted to the rear side of the engine block with an exhaust adapter plate disposed therebetween. The exhaust adapter plate is a separate component from the exhaust header pipe, which allows both components to be manufactured using simple die cast and/or lost foam casting techniques. It is preferred that the exhaust adapter plate be mounted to the rear side of the engine block using mounting bolts that are accessible from the rear side of the engine. It is further preferred that the exhaust header pipe be mounted to the engine block with the exhaust adapter plate disposed therebetween.

The exhaust passage in the exhaust header pipe accepts exhaust exiting from the engine at an upward angle. The header pipe angles upwardly from the exhaust passage inlet in the form of a megaphone to a high point for the exhaust passage, and then angles downwardly through the exhaust header pipe to an exhaust passage outlet. In effect, the high point for the exhaust passage forms a dam that prevents the backflow of water through the muffler into the engine. Exhaust exits from the exhaust passage outlet in the exhaust header pipe into a rubber exhaust tube which leads to a muffler. Another rubber exhaust tube connects the muffler to an exhaust discharge adapter on the intake housing for the jet pump of the personal watercraft. Exhaust discharges through the intake housing into the atmosphere.

The exhaust header pipe accepts exhaust gases passing rearward from the engine block and redirects the exhaust gases transversely across the watercraft engine compartment. Thus, even though the exhaust passage within the header pipe is sufficient to provide for adequate tuning and cooling of exhaust gases before exiting the exhaust header pipe, the exhaust header pipe is efficiently packaged tight to the rear side of the engine. Further, since there is typically sufficient room rearward of the exhaust header pipe within the engine compartment of the watercraft, it is easy to access mounting bolts for the exhaust header pipe and the exhaust adapter plate.

In another aspect, the exhaust header pipe and the exhaust adapter plate are plumbed to be part of the engine cooling water system. Pressurized cooling water is tapped from the stator section of the jet pump for the personal watercraft and pumped into a cooling water jacket surrounding the exhaust header pipe. The cooling water flows through the cooling jacket in the exhaust header pipe, and through the adapter plate into the engine block. The exhaust header pipe cooling water jacket is a divided water jacket that surrounds the exhaust passage through the exhaust header pipe. One side of the divided water jacket consists of an intake cooling water passage, and the other side consists of a spent cooling water passage. Cooling water supplied from the jet pump passes through the intake cooling water passage in the exhaust header pipe en route to the engine block. Spent cooling water from the engine block exits through the exhaust adapter plate into the spent cooling water passage in the exhaust header pipe. Most of the spent cooling water flowing through the spent cooling water passage in the exhaust header pipe exits through a spent cooling water hose that is connected to the jet pump intake housing to discharge the spent cooling water through the jet pump. However, it is preferred that the spent cooling water passage include another small orifice passing into the exhaust passage within the exhaust header pipe to facilitate cooling of exhaust gases before the exhaust gases exit exhaust header pipe and enter the rubber hose connected to the muffler.

Other features and advantages of the invention may be apparent to those skilled in the art upon reviewing the following drawings and description thereof.

BRIEF DESCRIPTION OF THE DRAWINGS

FIG. 3 is a rear view of the internal combustion engine and exhaust system shown in FIG. 2.

FIG. 5 is a sectional view of an exhaust header pipe in accordance with a preferred embodiment of the invention taken along line 5—5 in FIG. 2.

FIG. 6 is a sectional view of the exhaust header pipe taken along line 6—6 of FIG. 3.

FIG. 7 is a sectional view taken along line 7—7 of FIG. 3.

FIG. 8 is a sectional view taken along line 8—8 of FIG. 3.

DETAILED DESCRIPTION OF THE INVENTION

Figure 1:
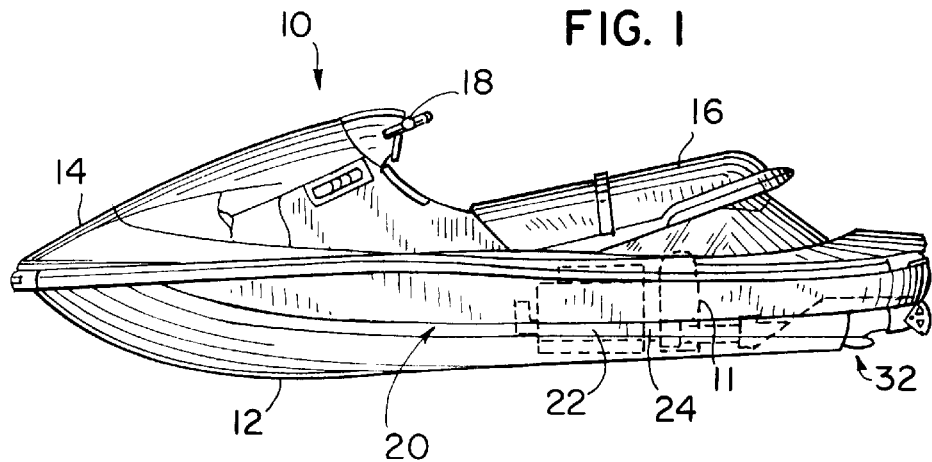
FIG. 1 is a schematic drawing illustrating a personal watercraft having an exhaust system in accordance with the invention.

FIG. 1 shows a personal watercraft 10 having an exhaust system 11 in accordance with the invention. The personal watercraft 10 has a hull 12, and a deck 14, both preferably made of fiber reinforced plastic. A driver and/or passenger riding on the watercraft 10 straddles a seat 16. The driver steers the watercraft 10 using a steering assembly 18 located forward of the seat 16.

An engine compartment 20 is located between the hull 12 and the deck 14. A gasoline fueled internal combustion engine 22 is located within the engine compartment 20. The engine 22 has an output or crankshaft shaft 30, FIG. 2, that is coupled to a jet pump located rearward of engine 22 generally in the vicinity shown by arrow 32.

Figure 2:
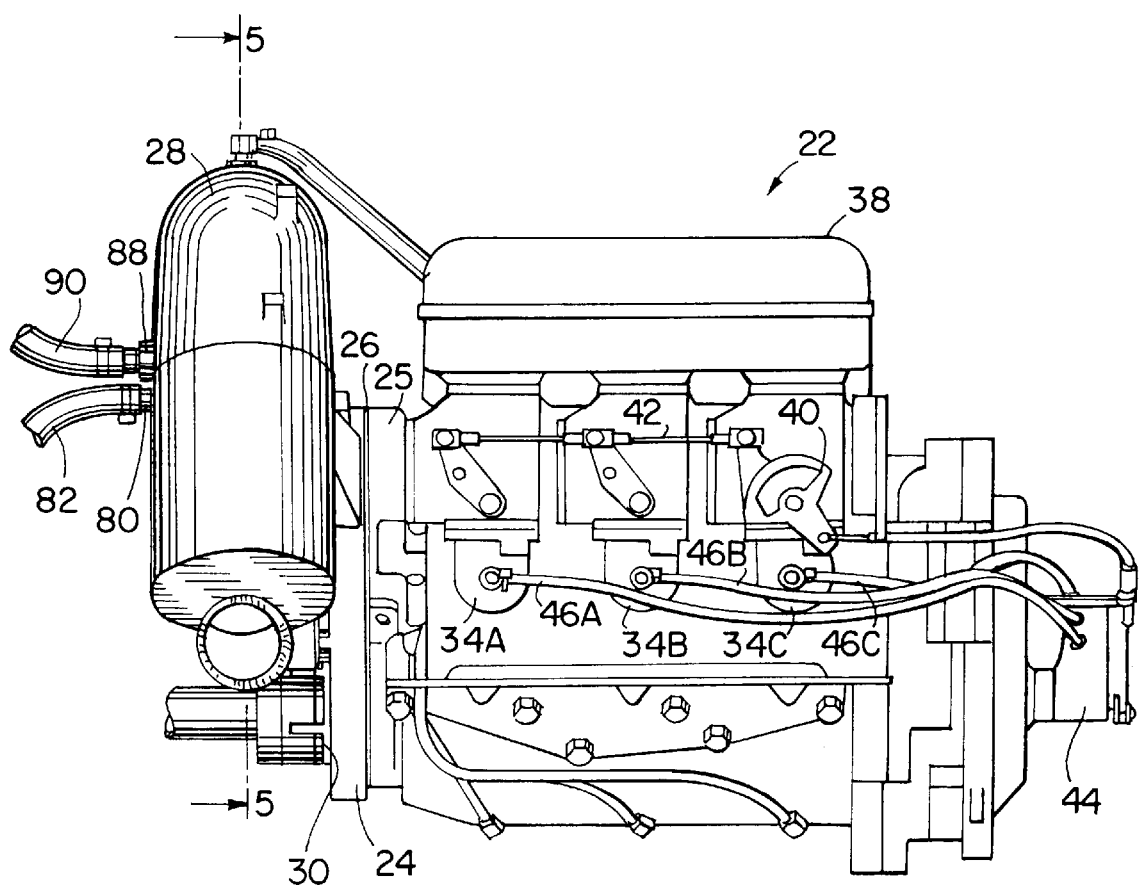
FIG. 2 is a side view of a two-cycle internal combustion engine and a portion of an exhaust system in accordance with a preferred embodiment of the invention.

In accordance with the invention, the exhaust system 11 includes an exhaust adapter plate 24 and an exhaust header pipe 28 as shown in FIG. 2. The exhaust adapter plate 24 and the exhaust header pipe 28 are separate physical components, FIG. 4. The exhaust adapter plate 24 is mounted adjacent and rearward of the engine block 25, FIG. 4. A gasket 26 is sandwiched between the engine block 24 and exhaust adapter plate 24, FIG. 4. The exhaust header pipe 28 is mounted adjacent and rearward of exhaust adapter plate 24. A gasket 27 is sandwiched between the exhaust header pipe 28 and the exhaust adapter plate 24.

Referring to FIG. 2, the engine 22 is preferably a three-cylinder, two-cycle internal combustion engine that is mounted to the hull 12 so that the crankshaft 30 is horizontal with respect to the watercraft 10. The engine block 25 includes an exhaust manifold that receives combustion products from the three engine cylinders. The exhaust manifold routes the exhaust from the combustion cylinders to an engine exhaust port 36, FIG. 7. The engine 22 is preferably mounted in the engine compartment 20 on the hull 12 so that the cylinder axes for the combustion cylinders form an approximately 40° angle with a horizontal plane. The exhaust port 36 from the engine block 28 exits rearward from the engine 22, and preferably slants upward as the exhaust port 36 exits rearward from the engine block 25.

Air is supplied to the engine 22 through an air intake plenum 38. From the air intake plenum 38, intake air is provided to the engine crankcase through air throttling mechanisms which are actuated by throttle arm 40 and linkage 42. An oil pump 44 provides oil through oil lines 46A, 46B, 46C to the engine 22 at locations 34A, 34B and 34C, respectively.

Figure 14:
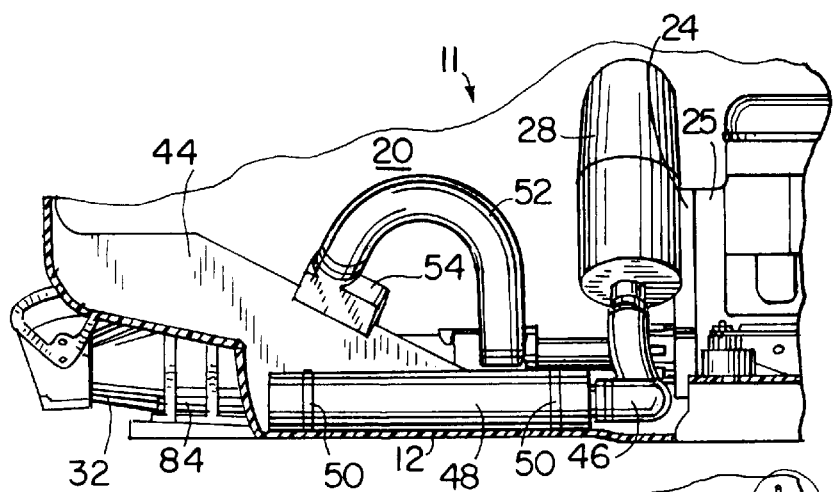
FIG. 14 is a side view of an exhaust system in accordance with the invention.
Figure 15:
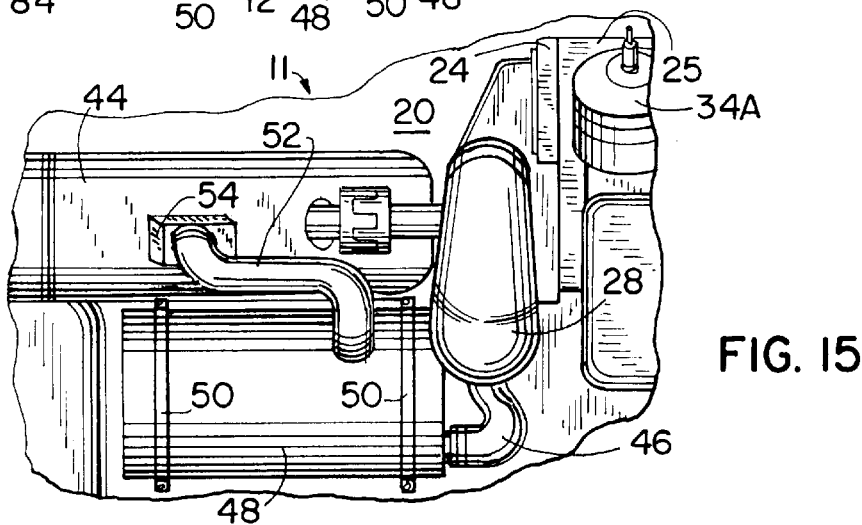
FIG. 15 is a top view of the exhaust system shown in FIG. 14.

Referring now to FIGS. 14 and 15, the exhaust system 11 routes engine exhaust from the exhaust manifold within the engine block 25 to an intake housing 44 for the jet pump 32. The exhaust is then discharged through the jet pump 32 into the atmosphere rearward of the watercraft 10. Exhaust exiting the exhaust manifold in the engine block 25 passes rearwardly through the exhaust adapter plate 24. From the exhaust adapter plate 24, exhaust flows transversely across the engine compartment 20 through the exhaust header pipe 28. The exhaust header pipe 28 is located in close proximity to the rear side of the engine block 25. From the exhaust header pipe 28, exhaust flows through a first flexible exhaust tube 46 into a muffler 48. The muffler 48 is mounted to the hull 12 of the watercraft 10 using mounting bands 50. Exhaust flows from the muffler 48 through a second flexible exhaust hose 52 to an exhaust adapter 54 on the intake housing 44 on the jet pump 32. The exhaust flows through the exhaust adapter 54 into the intake housing 44 and is discharged over the jet pump 32. Routing the exhaust through the intake housing 44 eliminates the need to provide an additional exhaust hole through the hull 12 or deck 14 of the watercraft 10. Therefore, exhaust from the engine 22 located within the engine compartment 20 of the watercraft 10 can be discharged without creating an additional opening through the deck 12 or hull 14 which could compromise the physical integrity of the watercraft 10.

As can be seen by inspecting FIGS. 1, 14 and 15, the exhaust system 11 is effectively packaged rearward of the engine 22, thus providing sufficient room in the engine compartment 20 rearward of the engine 22 to provide easy accessibility to the exhaust system 11 and the jet pump system 32. This improves the serviceability of the watercraft 10.

Figure 4:
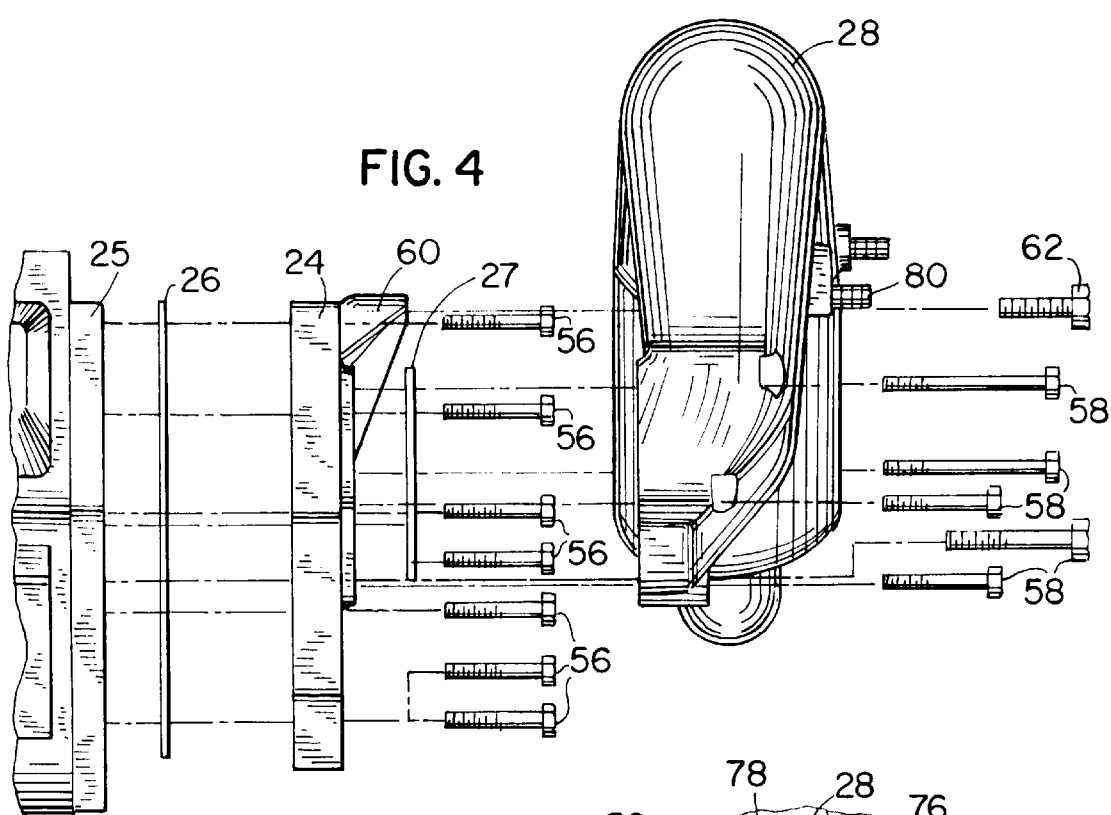
FIG. 4 is an assembly view of an exhaust adapter plate and an exhaust header pipe in accordance with a preferred embodiment of the invention.

Referring now to FIGS. 3 and 4, the adapter plate 24 is mounted to the engine block 25 using mounting bolts 56. FIG. 4 shows a gasket 26 located between the engine block 25 and the adapter plate 24. The exhaust header pipe 28 is mounted to the adapter plate 24 using bolts 58. A gasket 27 is located between the adapter plate 24 and the exhaust header pipe 28. Thus, the adapter plate 24 is disposed between the engine block 25 and the exhaust header pipe 28. The exhaust adapter plate 24 includes a mounting support 60 for the exhaust header pipe 28. Bolt 62 fastens the exhaust header pipe 28 to the mounting support 60 on the exhaust adapter plate 24 to stabilize the upper portion of the exhaust header pipe 28. All the bolts 56, 58, 62 are in-line and easily accessible from the rear of the engine 22.

Referring now to FIG. 5, the exhaust header pipe 28 contains an exhaust passage 64 extending between an exhaust passage inlet 66 and an exhaust passage outlet 68. The length and size of the exhaust passage 64 is selected for proper tuning of the exhaust paths to enhance performance of the engine 22. The exhaust header pipe 28 includes a double wall portion 70 and a single wall portion 72. The double wall portion 70 includes an inner wall 70A and an outer wall 70B. The exhaust passage 64 is defined by the single wall portion 72 of the exhaust header pipe 28 and the inner wall 70A of the double wall portion 70 of the exhaust header pipe 28. As the exhaust passage 64 extends from the inlet 66, the exhaust passage 64 is megaphone-shaped, which is useful for tuning performance. The exhaust passage inlet 66 receives exhaust flowing rearward and angling upward from the exhaust adapter plate 24. The exhaust passage 64 in the exhaust header pipe 28 redirects the flow of exhaust so that the exhaust flows transversely across the engine compartment 20 of the watercraft. As the exhaust passage 64 extends transversely across the engine compartment 20, the exhaust passage 64 angles upwards from the exhaust passage inlet 66 to a high point 74 of the exhaust passage 64, and then angles downward towards the exhaust passage outlet 68. In this manner, an exhaust passage 64 having sufficient length and cross-section for appropriate tuning can be compactly packaged rearward of the engine 22.

Referring now to FIGS. 5 and 6, the inner 70A and outer 70B walls of the double wall portion 70 of the exhaust header pipe 28 define a divided cooling water jacket. The divided cooling water jacket includes a passage 76 for intake cooling water and a passage 78 for spent cooling water. Pressurized cooling water is supplied to an intake cooling water inlet port 80 through a cooling water supply tube 82. Cooling water supply tube 82 receives pressurized cooling water from the stator section of the jet pump 32 as described in accordance with U.S. patent application Ser. No. 08/710,868, entitled "Intake Housing For Personal Watercraft", by James R. Jones, filed on Sep. 23, 1996, incorporated herein by reference. The stator is designated by reference number 84 in FIG. 14.

After pressurized intake cooling water enters the cooling water jacket in the exhaust header pipe 28, the cooling water flows from the intake port 80 through the intake cooling water passage 76 contained in the exhaust header pipe 28. From the cooling water passage 76, the cooling water flows from the exhaust header pipe 28 through the exhaust adapter plate 24 into the engine block 25 cooling jacket. Spent cooling water from the engine block 25 flows through the adapter plate 24 into a spent cooling water intake port 86 in the exhaust header pipe 28, and through the spent cooling water passage 78 contained in the exhaust header pipe 28 to a spent cooling water outlet port 88. The spent cooling water flows from the spent cooling water outlet port 88 on the exhaust header pipe 28 through a hose 90 that is connected to the exhaust adapter 54 on the intake housing 44 for the jet pump 32. The spent cooling water passage 78 also includes a small orifice 92 that allows a small amount of spent cooling water to be sprayed into the single wall portion 72 of the exhaust header pipe 28 to promote cooling of the exhaust gases before the exhaust gases exit the exhaust header pipe outlet 68 into the rubber hose 46.

Providing the divided cooling water jackets within the exhaust header pipe 28 coaxially surrounding a portion of the exhaust passage 64 has several advantages. First, the cooling water passages 76, 80 help to cool exhaust gases flowing through the exhaust header pipe 28, and also keep the exhaust header pipe 28 from heating to excessive temperatures. In addition, cooling water is slightly preheated before entering the engine block 25, which helps to prevent excessive temperature gradients within the engine block that can possibly physically distort the geometry of the engine block 25. Further, the interface 94 between the double wall portion 70 and the single wall portion 72 of the exhaust passage 64 provides a geometrical discontinuity that is useful for pulse tuning purposes. Preferably, the exhaust passage 64 megaphone is sized and positioned so that the blow down pulse from one of the cylinders provides a negative reflected pressure pulse back to that same cylinder which aids in scavenging the cylinder. Another advantage of routing the cooling water through the exhaust header pipe 28 is that the cooling water inlet and outlet ports 80, 88 conveniently located close to the jet pump 36 intake housing 44, thereby reducing the complexity of cooling water hose configurations.

The high point 74 of the exhaust header pipe 28 includes an air bleed 96 that is connected to a hose 98 which preferably is plumbed to a telltale near the bow of the watercraft 10. Alternatively, it may be desirable to plumb the high point air bleed 96 into the single wall portion 72 of the exhaust header pipe 28 in lieu of providing a small orifice 92 from the spent cooling water passage 78 into the exhaust passage 64. Preferably, the engine block 25 cooling jacket also includes an air bleed at its high spot which is also plumbed to the telltale near the bow of the watercraft 10. When the engine 22 is started, air will bleed through the air bleed 94 to assure complete filling of the water passages, and eventually some cooling water will exit through the air bleed fitting and through the telltale so that the driver of the boat knows that water is getting to the exhaust header pipe 28, and also to the engine 22.

The exhaust header pipe 28 is preferably made using lost foam techniques. The exhaust adapter plate 24 is preferably made using aluminum die cast techniques.

Figure 9:
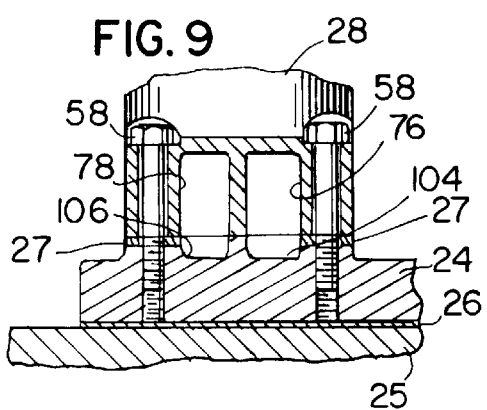
FIG. 9 is a sectional view taken along line 9—9 of FIG. 3.
Figure 10:
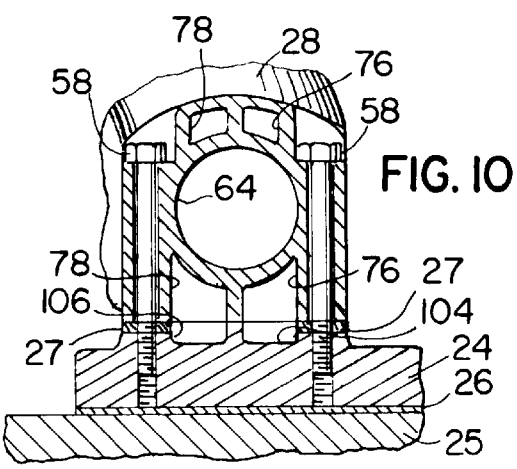
FIG. 10 is a sectional view taken along line 10—10 of FIG. 3.
Figure 11:
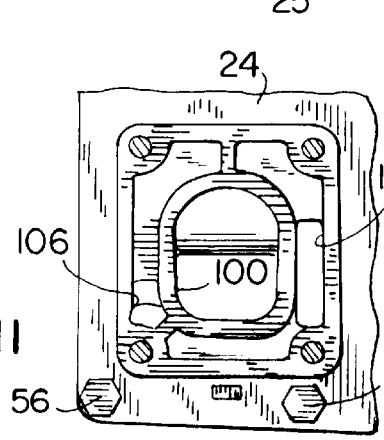
FIG. 11 is a sectional view taken along line 11—11 of FIG. 8.
Figure 12:
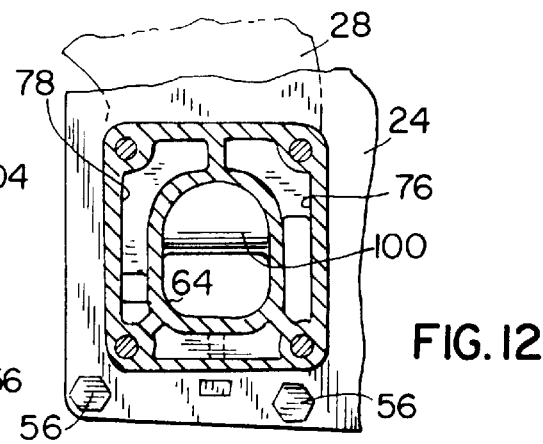
FIG. 12 is a sectional view taken along line 12—12 of FIG. 8.
Figure 13:
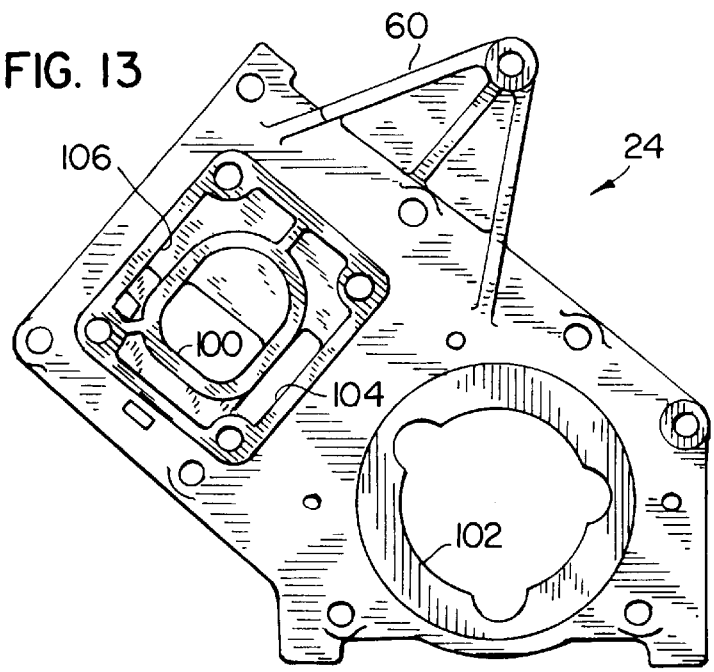
FIG. 13 is an elevational view of an exhaust adapter plate in accordance with a preferred embodiment of the invention.

Referring to FIG. 13, the exhaust adapter plate 24 includes an exhaust opening 100, and a crankshaft opening 102. An intake cooling water passage 104 and a spent cooling water passage 106 surround the exhaust opening 100 in the exhaust adapter plate 24. Referring to FIG. 7, the exhaust opening 100 slants upward as the exhaust opening 100 passes rearward through the exhaust adapter plate 24. The exhaust opening 100 in the exhaust adapter plate 24 is aligned with the exhaust outlet 36 on the engine block 25 and also with the exhaust inlet to the exhaust passage 64 for the exhaust header pipe 28. In addition, the intake cooling water opening 104 on the exhaust adapter plate 24 aligns with the intake cooling water passage 76 on the exhaust header pipe as well as the cooling water intake 108, FIG. 8 on the engine block. Likewise, the spent cooling water opening 106 in the exhaust adapter plate 24 aligns with the spent cooling water outlet 110 in the engine block as well as the spent cooling water passage 78 in the exhaust header pipe 28. FIGS. 9 and 10 are views similar to the view in FIG. 8 also showing detailed sectional views of the alignment of the engine block, the exhaust adapter plate 24, and the exhaust header pipe 28. The section shown in FIG. 9 is taken upstream of the section shown in FIG. 8, whereas the section shown in FIG. 10 is taken downstream of the section shown in FIG. 8. On the other hand, FIGS. 10 and 12 are sectional views taken orthogonal to FIG. 8, as depicted by lines 11—11 and 12—12 in FIG. 8. Inspection of FIGS. 7 through 12 emphasizes that the exhaust path from the engine block 25 through the exhaust adapter plate 24 and through the exhaust header pipe 28, as well as the cooling water passages 76, 78, 104, 106 are curvilinear which enables the exhaust and cooling water flows to be redirected without causing undue restrictions.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A personal watercraft comprising:
an engine block mounted to the watercraft so that an engine crankshaft is horizontal with respect to the watercraft, the engine block including an exhaust manifold having an exhaust port facing rearward of the engine block;
an exhaust adapter plate having an exhaust opening and a crankshaft opening, the exhaust adapter plate being mounted to the engine block so that the exhaust opening in the exhaust adapter plate is aligned with the exhaust port from the exhaust manifold and so that the engine crankshaft passes through the crankshaft opening in the exhaust adapter plate; and
an exhaust header pipe having an exhaust passage with an inlet and an outlet, the exhaust header pipe being mounted to the engine block with the exhaust adapter plate disposed therebetween so that the inlet to the exhaust header pipe exhaust passage is aligned with the exhaust opening in the exhaust adapter plate; and wherein
the engine block is water cooled and an intake cooling water inlet and a spent cooling water outlet surround the exhaust port on the engine block;
the exhaust adapter plate includes an intake cooling water opening and a spent cooling water opening; and
the exhaust header pipe includes an intake cooling water passage and a spent cooling water passage surrounding the exhaust passage in the exhaust header pipe, the intake cooling water passage having an outlet aligned with the intake cooling water opening in the exhaust adapter plate and the intake cooling water inlet in the engine block, and the spent cooling water passage in the exhaust header pipe having an inlet that is aligned with the spent cooling water opening in the exhaust adapter plate and the spent cooling water outlet in the engine block.

2. A watercraft as recited in claim 1 wherein:
the exhaust port from the exhaust manifold angles upward as the port exits rearward of the engine block;
the exhaust opening in the exhaust adapter plate angles continuously upward as the opening extends rearward through the exhaust adapter plate; and
the inlet for the exhaust passage on the exhaust header pipe angles upward as the inlet extends rearward into the exhaust header pipe exhaust passage.

3. A watercraft as recited in claim 1 wherein the exhaust passage through the exhaust header pipe provides an exhaust flow path from the exhaust opening through the exhaust adapter plate to an exhaust tube which is connected to a muffler.

4. A watercraft as recited in claim 1 wherein the exhaust passage through the exhaust header pipe extends upwardly from the exhaust passage inlet to a high point and extends downwardly from the high point to the exhaust passage outlet.

5. A watercraft as recited in claim 4 wherein the length of the exhaust passage through the exhaust header pipe between the exhaust passage inlet and the exhaust passage outlet is selected to facilitate tuning to enhance volumetric efficiency within cylinders located within the engine block.

6. A watercraft as recited in claim 1 wherein:
the exhaust adapter plate further includes an exhaust header pipe support member; and
the exhaust header pipe is further supported by mounting the exhaust header pipe to the support member on the exhaust adapter plate.

7. A watercraft as recited in claim 6 wherein the exhaust header pipe is mounted to the support member on the exhaust adapter plate using one or more fasteners that are accessible rearward of the exhaust header pipe.

8. A watercraft as recited in claim 4 wherein exhaust entering the exhaust passage inlet in the exhaust header pipe enters in the rearward direction, and exhaust passing through the exhaust passage in the exhaust header pipe from the exhaust passage inlet to the exhaust passage outlet passes in a transverse direction across the engine compartment of the watercraft.

9. A watercraft as recited in claim 4 wherein the exhaust passage within the exhaust header pipe has a megaphone shape.

10. A watercraft as recited in claim 1 wherein the watercraft includes an engine cooling water supply system comprising:
a pressurized intake cooling water port on the exhaust header pipe;
an intake cooling water passage contained in the exhaust header pipe and communicating with the pressurized intake cooling water port;
a spent cooling water outlet port on the exhaust header pipe;
a spent cooling water passage contained in the exhaust header pipe and communicating with the spent cooling water outlet port;
a first tube for transporting cooling water from a stator portion of a jet pump for the watercraft to the pressurized cooling water inlet port on the exhaust header pipe; and
a second tube for transporting spent cooling water from the spent cooling water outlet port on the exhaust header pipe to the jet pump for discharging the spent cooling water.

11. A watercraft as recited in claim 10 wherein the exhaust header pipe has an air bleed port on the spent cooling water passage contained in the exhaust header pipe.

12. A personal watercraft comprising:
an engine mounted in an engine compartment within the watercraft so that an engine crankshaft is horizontal with respect to the watercraft, the engine having an exhaust port facing rearward of the engine;
an exhaust adapter plate mounted to the engine so that an exhaust opening in the exhaust adapter plate corresponds to the exhaust port on the engine block;
an exhaust header pipe mounted to the engine with the exhaust adapter plate disposed therebetween, the exhaust header pipe having an exhaust passage with an inlet and an outlet, the exhaust passage inlet receiving exhaust passing through the exhaust adapter plate;
a muffler;
a first exhaust tube that transports exhaust from the exhaust passage outlet of the exhaust header pipe to the muffler;
a jet pump intake housing having an exhaust adapter;
a second tube that transports exhaust from the muffler to the exhaust adapter on the intake housing so that exhaust can be discharged over the jet pump to the atmosphere.

13. A watercraft as recited in claim 12 wherein the exhaust adapter plate also contains a crankshaft opening through which the engine crankshaft passes.

14. A watercraft as recited in claim 12 wherein the muffler is attached to the hull of the watercraft.

15. In an exhaust system for an engine mounted in an engine compartment within a personal watercraft so that an engine crankshaft is horizontal with respect to the watercraft and an engine exhaust port faces rearward of the engine, an improvement comprising:

an exhaust adapter plate mounted to the engine so that an exhaust opening in the exhaust adapter plate corresponds to the exhaust port on the engine, the exhaust opening in the adapter plate angling upwards as the exhaust opening extends rearward through the exhaust adapter plate;

an exhaust header pipe that is physically separate from the exhaust adapter plate and is mounted to the engine with the exhaust adapter plate disposed therebetween, the exhaust header pipe having an exhaust passage and an inlet and an outlet to the exhaust passage;

wherein the inlet to the exhaust header pipe exhaust passage is aligned with the exhaust opening in the exhaust adapter plate to receive exhaust flowing rearward and angling upward from the engine exhaust port and the exhaust adapter plate, and the exhaust passage in the exhaust header pipe is tuned and redirects exhaust gases to flow transversely across the watercraft engine compartment between the inlet and the outlet of the exhaust passage through the exhaust header pipe; and wherein the exhaust passage angles upwards to an exhaust passage high point as the exhaust passage extends transversely from the exhaust passage inlet to the exhaust passage outlet and angles downwardly from the high point of the exhaust passage to the exhaust passage outlet.

16. An improvement as recited in claim 15 wherein the exhaust header pipe further comprises:

a double wall portion having an inner wall and an outer wall and a single wall portion, the exhaust passage through the exhaust header pipe defined by the single wall portion and the inner wall of the double wall portion;

wherein the double wall portion includes a divided cooling jacket between the inner wall and the outer wall, the divided cooling water jacket including a passage for intake cooling water and a passage for spent cooling water.

17. An improvement as recited in claim 15 wherein the exhaust header pipe has an air bleed port on the spent cooling water passage contained in the exhaust header pipe at a location in the vicinity of the high point of the exhaust passage.

18. An improvement as recited in claim 15 wherein the exhaust adapter plate also includes a support mount in the vicinity of the high point of the exhaust passage to which the exhaust header pipe is mounted.

19. A personal watercraft comprising:

an engine block mounted to the watercraft so that an engine crankshaft is horizontal with respect to the watercraft, the engine block including an exhaust manifold having an exhaust port facing rearward of the engine block;

an exhaust adapter plate having an exhaust opening and a crankshaft opening, the exhaust adapter plate being mounted to the engine block so that the exhaust opening in the exhaust adapter plate is aligned with the exhaust port from the exhaust manifold and so that the engine crankshaft passes through the crankshaft opening in the exhaust adapter plate; and an exhaust header pipe having an exhaust passage with an inlet and an outlet, the exhaust header pipe being mounted to the engine block with the exhaust adapter plate disposed therebetween so that the inlet to the exhaust header pipe exhaust passage is aligned with the exhaust opening in the exhaust adapter plate;

wherein the exhaust header pipe and the exhaust adapter plate are mounted to the rear of the engine block using fasteners passing through the exhaust header pipe and exhaust adapter in the engine block, and wherein the fasteners are accessible rearward from the exhaust header pipe.

20. A watercraft as recited in claim 19 wherein the fasteners are threaded bolts.

21. A watercraft as recited in claim 19 wherein the exhaust adapter plate is further mounted to the rear of the engine block using fasteners passing through the exhaust adapter plate into the engine block, and wherein the fasteners are accessible rearward form the exhaust adapter plate.

22. A personal watercraft comprising:

an engine block mounted to the watercraft so that an engine crankshaft is horizontal with respect to the watercraft, the engine block including an exhaust manifold having an exhaust port facing rearward of the engine block; and an exhaust adapter plate having an exhaust opening and a crankshaft opening, the exhaust adapter plate being mounted to the engine block so that the exhaust opening in the exhaust adapter plate is aligned with the exhaust port from the exhaust manifold and so that the engine crankshaft passes through the crankshaft opening in the exhaust adapter plate;

an exhaust header pipe having an exhaust passage with an inlet and an outlet, the exhaust header pipe being mounted to the engine block with the exhaust adapter plate disposed therebetween so that the inlet to the exhaust header pipe exhaust passage is aligned with the exhaust opening in the exhaust adapter plate;

wherein the exhaust header pipe comprises:

a double wall portion having an inner wall and an outer wall, and a single wall portion;

the exhaust passage through the exhaust header pipe defined by the single wall portion and inner wall of double wall portion wherein the double wall portion includes a divided cooling water jacket between the inner wall and the outer wall, the divided cooling water jacket including a passage for intake cooling water and a passage for spent cooling water.

* * * * *